(12) United States Patent
Oda

(10) Patent No.: US 6,870,097 B2
(45) Date of Patent: Mar. 22, 2005

(54) ELECTRICAL JUNCTION BOX

(75) Inventor: Akihiro Oda, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 0 days.

(21) Appl. No.: 10/890,119

(22) Filed: Jul. 14, 2004

(65) Prior Publication Data

US 2005/0011658 A1 Jan. 20, 2005

(30) Foreign Application Priority Data

Jul. 15, 2003 (JP) .......................................... 2003-197298

(51) Int. Cl.⁷ ............................................... H02G 3/08
(52) U.S. Cl. ......................... 174/50; 174/59; 439/76.2; 439/949
(58) Field of Search .............................. 174/50, 59, 60, 174/61; 439/76.2, 76.1, 709, 949; 220/3.2, 3.3, 3.4, 4.02; 361/600

(56) References Cited

U.S. PATENT DOCUMENTS

| | | | |
|---|---|---|---|
| 6,290,509 B1 | | 9/2001 | Hattori et al. |
| 6,354,846 B1 | * | 3/2002 | Murakami ................ 439/76.2 |
| 6,364,670 B1 | * | 4/2002 | Wickett et al. ............. 439/949 |
| 6,368,142 B2 | * | 4/2002 | Katoh et al. ................ 439/949 |
| 6,808,397 B2 | * | 10/2004 | Kondo ...................... 439/76.2 |
| 6,814,591 B2 | * | 11/2004 | Oka et al. .................. 439/76.2 |

FOREIGN PATENT DOCUMENTS

| JP | U 5-78125 | 10/1993 |
|---|---|---|
| JP | A 2000-152464 | 5/2000 |

* cited by examiner

*Primary Examiner*—Dean A. Reichard
*Assistant Examiner*—Angel R. Estrada
(74) *Attorney, Agent, or Firm*—Oliff & Berridge, PLC

(57) ABSTRACT

A casing including an upper casing member and a lower casing member is provided on the sidewalls with a connector hood for receiving a connector for lateral connection in order to provide an electrical junction box in which a divided connector hood integrated on upper and lower casing members can exert a sufficient holding force on a mating connector. The connector hood includes a first hood section that projects from the sidewall of the upper casing member and a second hood section that projects from the sidewall of the lower casing member. When the first and second hood sections are assembled integrally, they present a square frame configuration. One of the sections is formed into a U-shape in cross section. Each arm of the U-shape is provided on the free end with a holding portion extending inward. The other of the sections is formed into a flat plate to be fitted in the holding portions. Only the hood section provided with the holding portions can hold a mating connector fitted in the connector hood.

2 Claims, 8 Drawing Sheets

ELECTRICAL JUNCTION BOX

CLAIM FOR PRIORITY

The present invention relates to subject-matter contained in and claims priority to JP 2003-197298, filed on Jul. 15, 2003, the entire disclosure of which is incorporated herein by reference thereto.

BACKGROUND OF THE INVENTION

1. Field of Invention

This invention relates to an electrical junction box for an automobile vehicle, and more particularly relates to an electrical junction box for an automobile vehicle having a casing a sidewall of which can receive a connector hosing for lateral connection.

2. Description of Related Art

In general, as shown in FIG. 7, a conventional electrical junction box 1 for an automobile vehicle has a casing including a lower casing member 2 and an upper casing member 3. A circuit body 4 including single-core wires, bus bars, and the like is arranged in the casing. Terminals 5 are connected to the circuit body 4. The terminals 5 extend into mounting sections 6 on the surface of the upper casing member 3. Connector hoods 9a, 9b . . . are formed integrally on the mounting sections 6 to receive a socket 7 for a relay or a fuse and mating connectors 8a, 8b. . . .

Since the connector hoods 9a, 9b . . . are provided on the surface of the upper casing member 3 in the above electrical junction box 1, a great space is required in the thickness direction of the electrical junction box 1 in order to dispose in the vehicle the electrical junction box 1 including the mating connectors 8a, 8b., which are coupled to the connector hoods 9a, 9b., and electrical wires W that are inserted into the mating connectors 8a, 8b. Consequently, if an arrangement space S is narrow in the vehicle, there may be a case where the mating connectors 8a, 8b . . . having a great size cannot be coupled to the connector hoods 9a, 9b.

As shown in FIG. 8, it is possible to dispose an electrical junction box in a narrow space in the vehicle by using an electrical junction box 1' in which connector hood sections 9a' and 9b' are provided on sidewalls A of a lower casing member 2' and an upper casing member 3'. See Japanese Patent Public Disclosure 2000-182682.

SUMMARY OF THE INVENTION

However, the connector hood sections 9a' and 9b' of the electrical junction box 1' are half members divided from the connector hood and are integrated to the lower casing member 2' and upper casing member 3'. Consequently, the connector hood sections 9a' and 9b' are formed into U-shape in cross section. The connector hood sections 9a' and 9b' form a frame configuration for receiving a mating connector when the upper and lower casing members 3' and 2' are coupled to each other. However, if the mating connector gives an undue insertion force to the connector hood upon connection of the mating connector, the mating connector will open the connector hood and a sufficient holding force will not be exerted to the mating connector.

In order to achieve the above object, an electrical junction box is provided comprising a casing including an upper casing member and a lower casing member; and a connector hood provided on a sidewall of the casing for receiving a connector for lateral connection.

The connector hood includes a first hood section projecting from a sidewall of the upper casing member and a second hood section projecting from a sidewall of the lower casing member. The connector hood is formed into a square frame configuration when the first and second hood sections are coupled to each other. One of the first and second hood sections is formed into a U-shape in cross section. Each arm of the U-shape is provided on the free end with a holding portion extending inward. The other of the first and second hood sections is formed into a flat plate to be fitted in a channel defined between the holding portions. The one hood section can hold a mating connector received in the connector hood.

According to the above construction, it is possible to enhance a holding force against an undue insertion of the mating connector, because the one of the first and second hood sections has holding portions that extend inward on the ends of the arms of the U-shape and has four corner portions. It is possible to exert a dust-proof function in the connector hood, because the flat plate of the other hood section is fitted in the channel between the inward directed holding portions of the one hood section to enclose the whole peripheral surface of the mating connector.

To be more specific, the first and second hood sections are provided on inner parts with first and second partitions. A tab to be connected to a terminal of the mating connector is clamped between jointing surfaces of the first and second hood sections. Thus, it is possible to clamp and position the tab extending into the interior of the connector hood upon assembly of the upper and lower casing members. It is also possible to simplify an assembling work, because a work for passing the tab into a through-hole in the connector hood is not required.

BRIEF DESCRIPTION OF THE DRAWINGS

The accompanying drawings, which are incorporated into and constitute a part of the specification, illustrate one or more exemplary embodiments of the invention, and taken with the detailed description, serve to explain the principles and implementation of the invention. In the drawings.

DETAILED DESCRIPTION OF EXEMPLARY EMBODIMENTS

Figure 1:
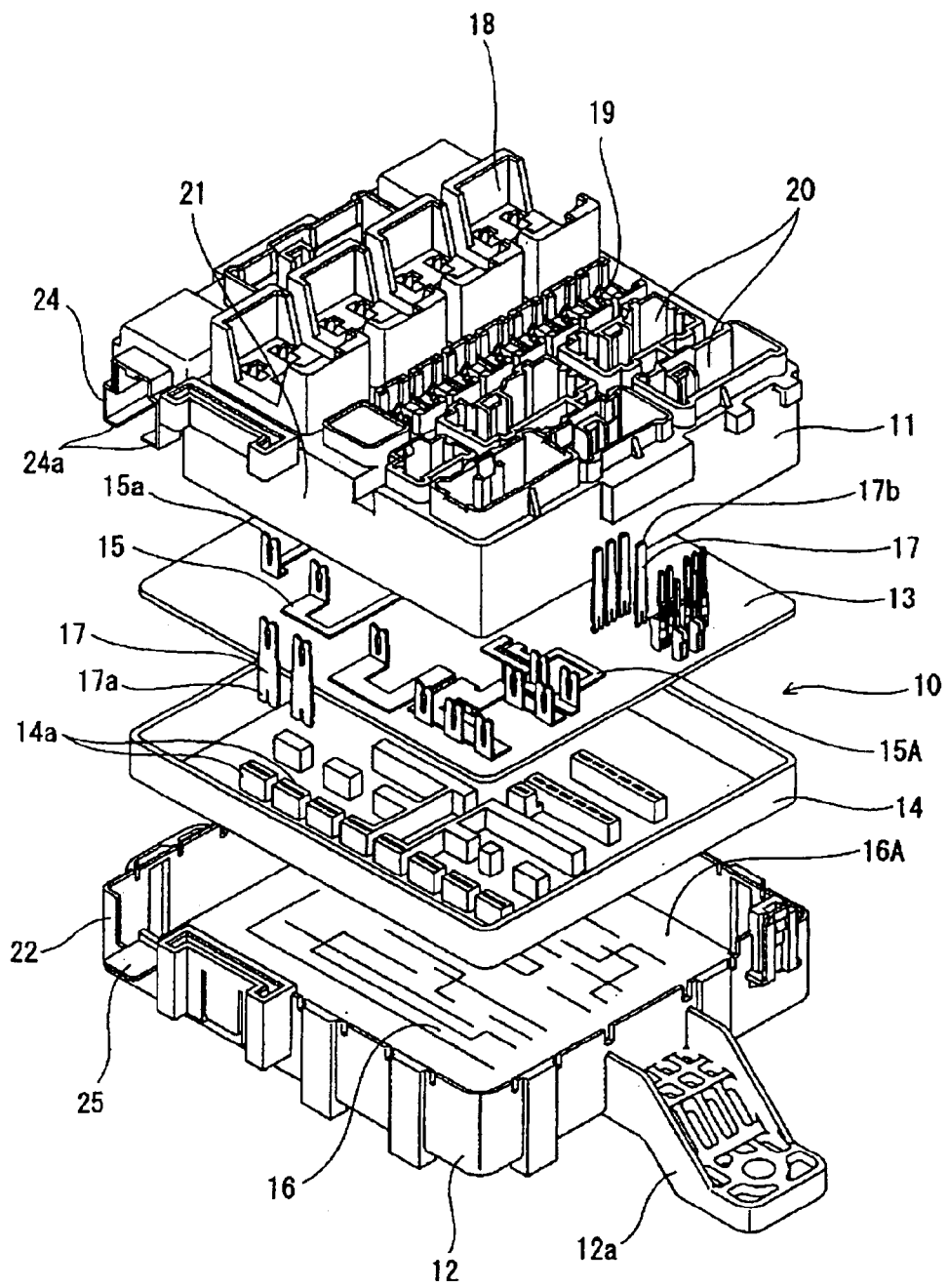
FIG. 1 is a perspective view of an exemplary embodiment of an electrical junction box.

Referring now to the drawings, exemplary embodiments of an electrical junction box will be described below.

FIG. 1 is an exploded perspective view of an electrical junction box 10. The electrical junction box 10 includes a casing made of a synthetic resin material and having an upper casing member 11 and a lower casing member 12, insulation plates 13 and 14 stacked between the upper and lower casing members 11 and 12, and arrangement elements such as bus bars 15 and single-core wires 16, insulation displacement terminals 17 to be connected to the single-core wires 16.

Circuit bodies 16A comprising the single-core wires 16 are arranged along given patterns in the lower casing member 12. A number of insulation displacement terminals 17 are supported by terminal-holding sections 14a on a lower insulation plate 14. When lower press-contact portions 17a of the insulation displacement terminals 17 press the single-core wires 16, the wires 16 are connected to the terminals 17 at the predetermined positions, respectively.

Circuit bodies 15A including the bus bars 15 are arranged in given patterns on the upper insulation plate 13. An end of each bus bar 15 is bent up toward the upper casing member 11. The distal end of the bus bar 15 is formed into a terminal portion 15a including an insulation displacement portion or a tab portion.

Relay-receiving sections 18, fuse-receiving sections 19, and connectors receiving sections 20 are juxtaposed on the top surface of the upper casing member 11. The respective terminal portions 15a bent up from the insulation plate 13 and the terminal portions 17b including the insulation displacement portions or tab portions formed on the upper ends of the insulation displacement terminals 17 supported on the insulation plate 14 are contained in the respective relay-receiving sections 18, fuse-receiving sections 19, and connector-receiving sections 20.

Figure 2:
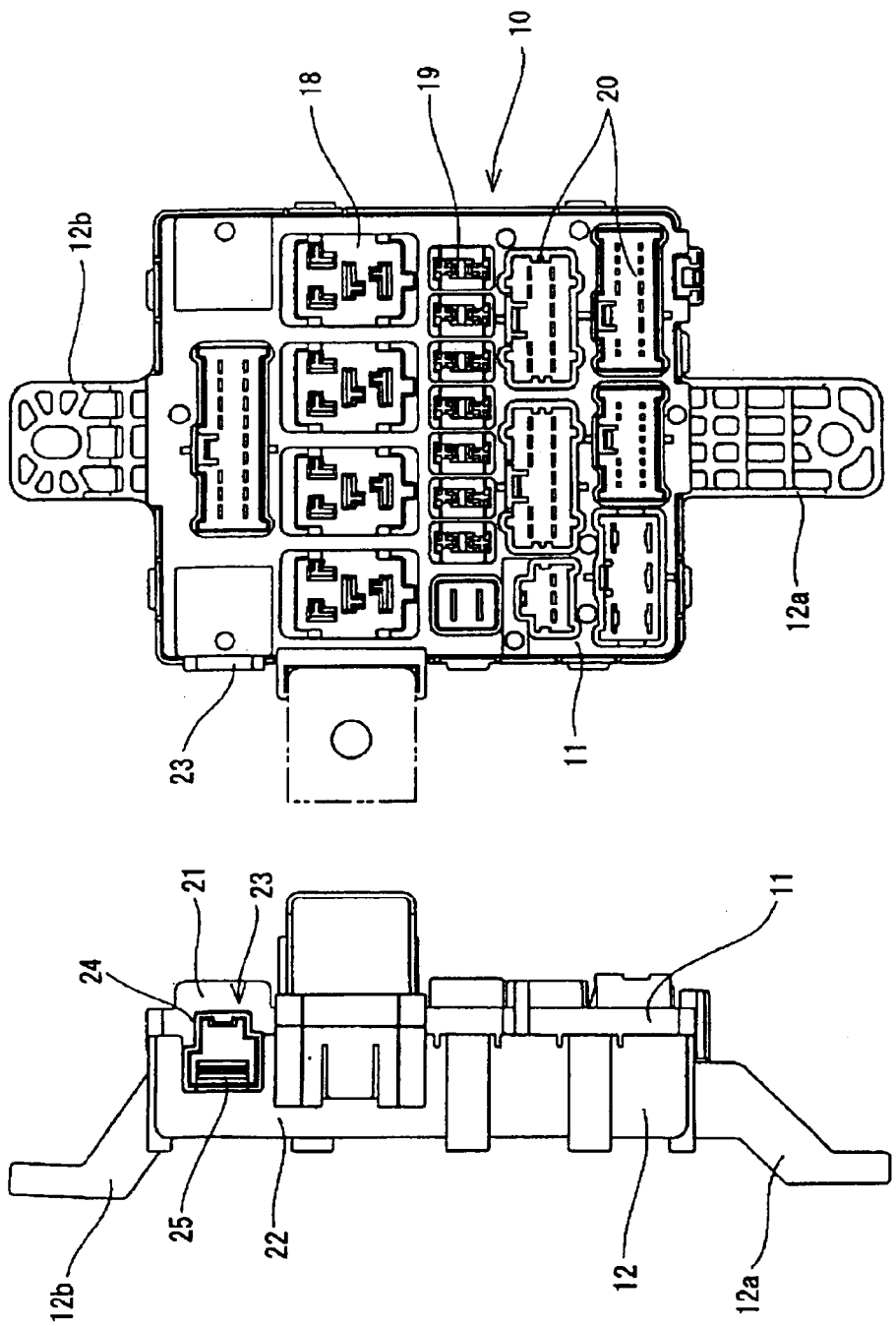
FIG. 2A is a side elevation view of the electrical junction box, illustrating a position where an upper casing member is mounted on a lower casing member.
FIG. 2B is a plan view of the electrical junction box shown in FIG. 2A.

As shown in FIGS. 2A and 2B, the upper casing member 11 is fitted on the lower casing member 12 with a sidewall 21 of the member 11 contacting with an inner peripheral surface of a sidewall 22 of the member 12. The members 11 and 12 are secured to each other by locking means.

Figure 3:
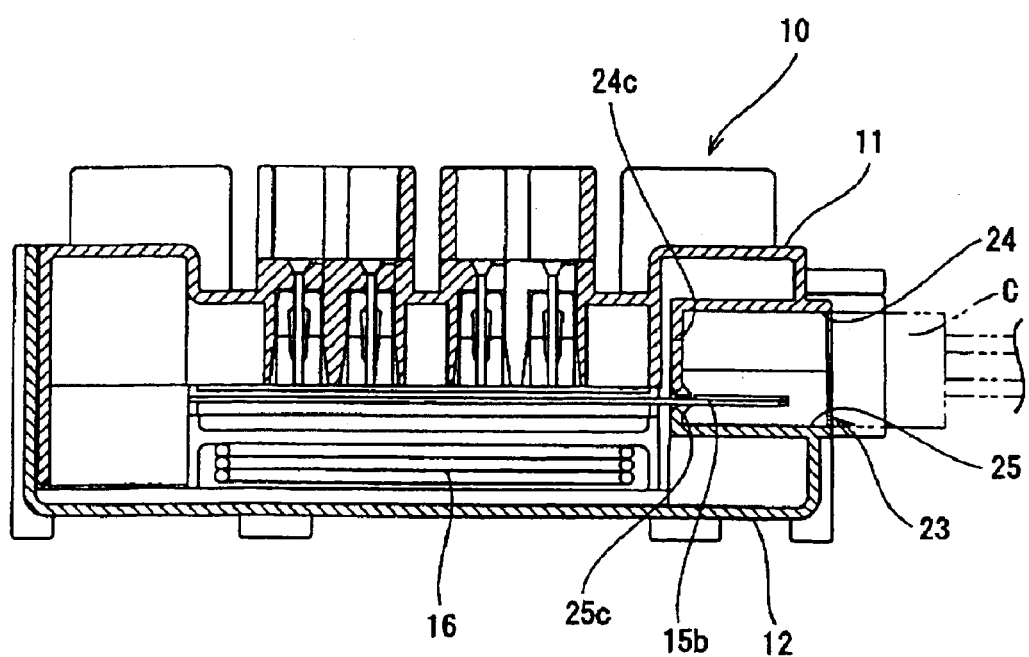
FIG. 3 is a sectional view of the electrical junction box on which a connector hood is fixed.

In the electrical junction box 10 constructed above, in addition to a connector housing 20 provided on the top surface of the upper casing member 11, a connector hood 23 for receiving a connector for lateral connection extends through the sidewalls 21 and 22 inward and outward in the horizontal direction, as shown in FIG. 3. The connector hood 23 has advantages under the condition: when the mating connector C is engaged with the top surface of the upper casing member 11; when a size in height of the electrical junction box 10 including an area of bending the electrical wires becomes great and the box 10 cannot be contained in a given space in a vehicle in the thickness direction of the box 10; or when a connector is received near the sidewalls 21 and 22.

Figure 4A:
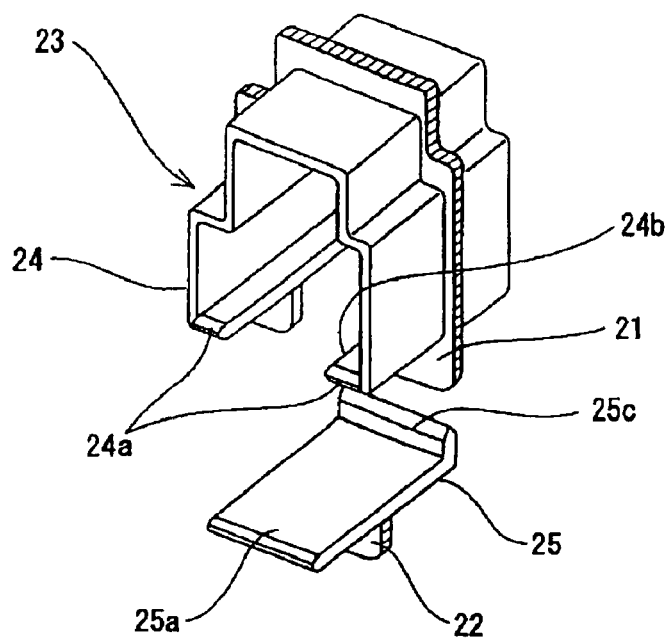
FIG. 4A is an exploded perspective view of the connector hood before being assembled.
Figure 4B:
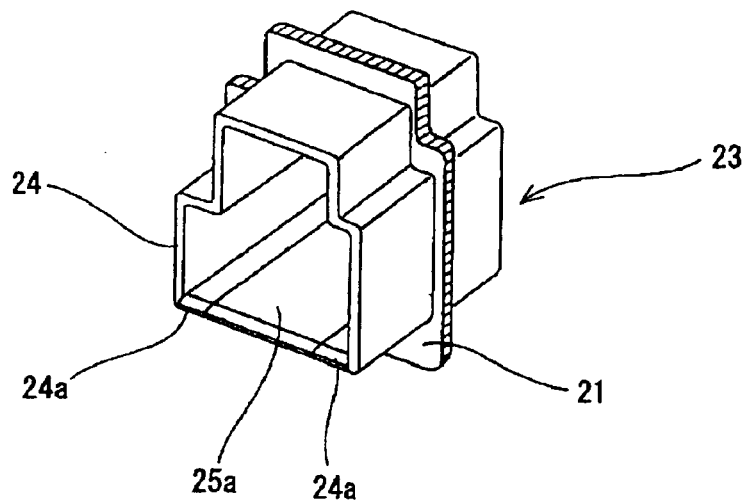
FIG. 4B is a perspective view of the connector hood after being assembled.

As shown in FIGS. 4A and 4B, the connector hood 23 is formed into a divided structure including a first hood section 24 that is integrated with and extends outward from the sidewall 21 of the upper casing member 11 and a second hood section 25 that is integrated with and extends outward from the sidewall 22 of the lower casing member 12. When the upper and lower casing members 11 and 12 are coupled to each other, the first and second hood sections 24 and 25 are interconnected to form a square frame configuration.

The first hood section 24, as shown in FIG. 4A, is formed into a U-shape in cross section. Each arm of the U-shape has a holding portion 24a extending inward. A channel 24b is defined between the holding portions 24a. Because the first hood section 24 is formed into the U-shape and the holding portions 24a of the arms of the U-shape can support four corners of the mating connector C fitted in the connector hood 23, it is possible to steadily hold the mating connector C by only the first hood section 24.

The second hood section 25 is formed into a flat support plate 25a. When the upper and lower casing members 11 and 12 are coupled to each other, the flat support plate 25a of the second hood section 25 engages the channel 24b defined between the holding portions 24a so that the plate 25a is disposed on the same plane as that of the holding portions 24a. When the first and second hood sections 24 and 25 are coupled to each other, the connector hood 23 is formed to close the peripheral wall.

Figure 5:
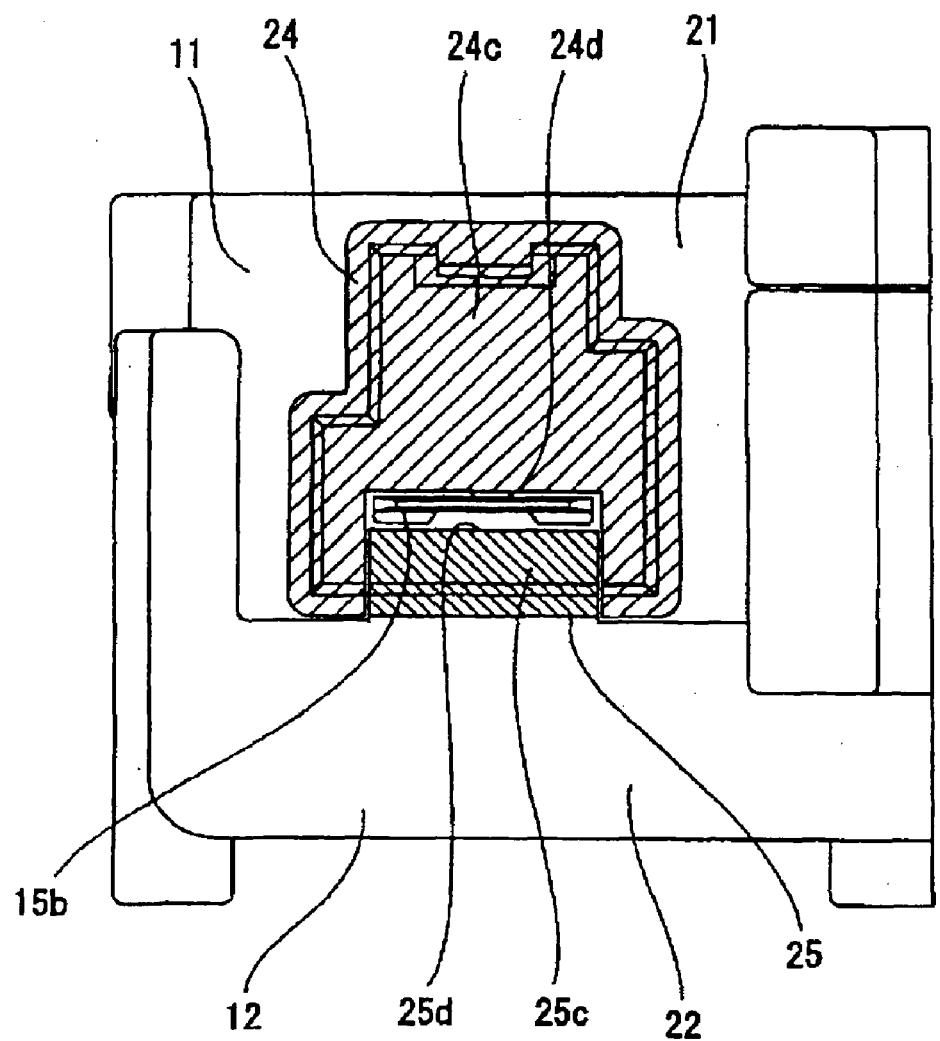
FIG. 5 is an enlarged front elevation view of a main part of a casing in which an upper casing member and a lower casing member are interconnected.

As shown in FIG. 5, the first and second hood sections 24 and 25 are integrally provided on the inner parts with first and second partitions 24c and 25c that are parallel to the sidewalls 21 and 22, respectively. The first and second partitions 24c and 25c are jointed when the first and second hood sections 24 and 25 are coupled to each other. The first and second partitions 24c and 25c are provided in their jointing surfaces with recesses 24d and 25d that serve to bring the tab 15b formed on an end of the bus bar 15 into entering the interior of the connector hood 23, thereby clamping the tab 15 between the jointing surfaces of the partitions 24c and 25c.

Next, an operational of the electrical junction box 10 constructed above will be explained below.

As shown in FIG. 1, interior mounting elements such as insulation plates 13 and 14, bus bars 15, and single-core wires 16, and insulation displacement terminals 17 are disposed between the upper and lower casing members 11 and 12. As shown in FIGS. 2A and 2B and FIG. 4, the electrical junction box 10 is assembled by coupling the upper and lower casing members 11 and 12.

An area shown by right-raising diagonal lines in FIG. 5 designates the first hood section 24 in conjunction with an area shown by right-descending diagonal lines in FIG. 5 designates the second hood section 25. At this time, the first and second hood sections 24 and 24 of the connector hood 23 is displaced from the separated position shown in FIG. 4A to the jointed position shown in FIG. 4B.

As shown in FIG. 3, the tab 15b to be connected to the mating connector C is clamped between the first and second partitions 24c and 25c of the first and second hood sections. Upon attachment of the electrical junction box 10, leg portions 12a and 12b (FIGS. 2A and 2B) extending from the opposite sides of the lower casing member 12 secure the electrical junction box 10 to the given position in a vehicle. A corresponding connector (not shown) is engaged with the connector-receiving section 20 disposed on the top surface of the upper casing member 11.

Furthermore, the mating connector C is received in the connector hood 23 on the sidewalls 21 and 22 of the electrical junction box 10. At this time, although the connector hood 23 is a divided structure including the first and second hood sections 24 and 25, because the first hood section 24 can positively enclose the four corners of the mating connector C, it is possible to hold the mating connector C by only the first hood section 24. Accordingly, there is no problem in which the connector hood 23 is deformed by undue engagement of the mating connector C and the connector C comes out of the hood 23.

Figure 6A:
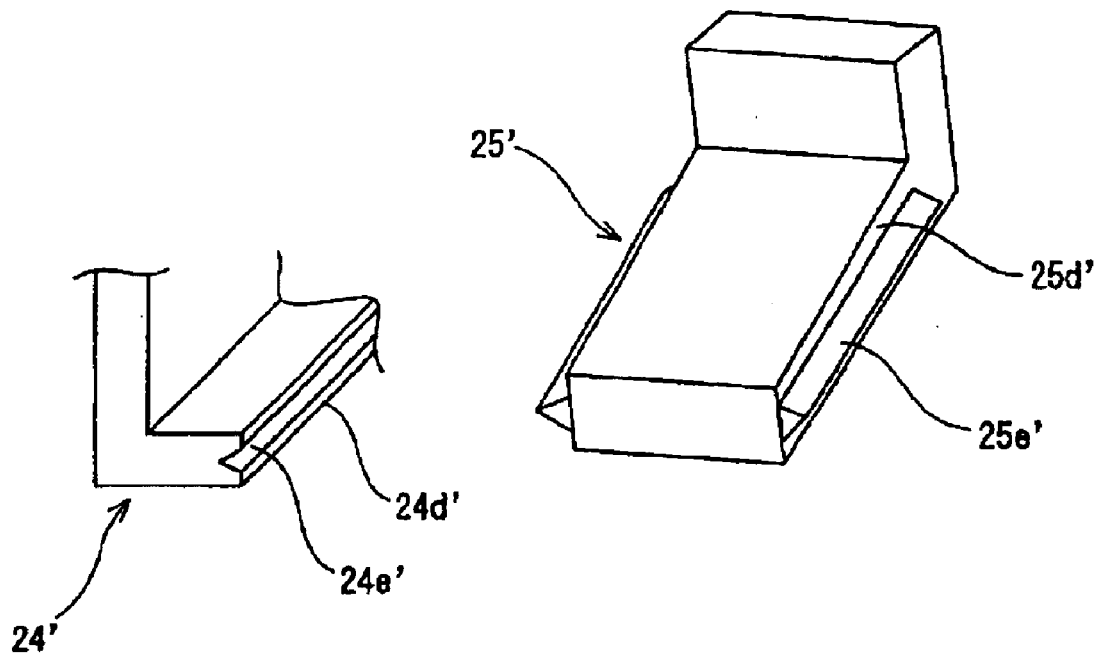
FIG. 6A is a perspective view of an alteration of a second hood section.
Figure 6B:
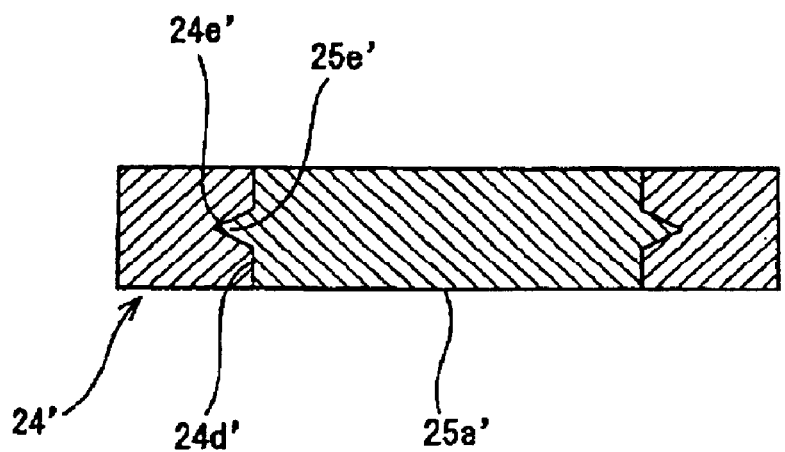
FIG. 6B is a cross section view of the alteration of the second hood section shown in FIG. 6A.
Figure 7:
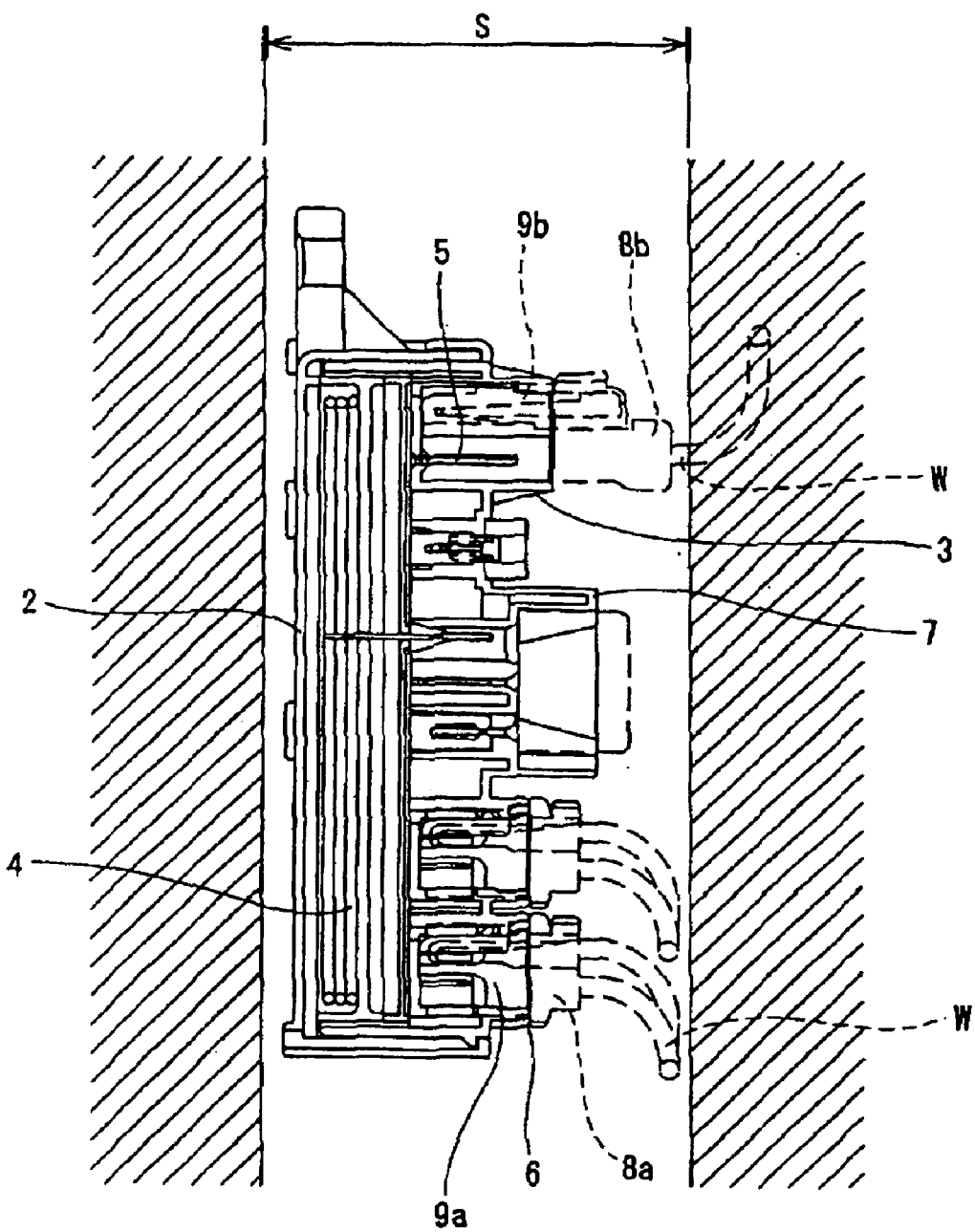
FIG. 7 is a side elevation view of a conventional electrical junction box mounted on a vehicle.
Figure 8:
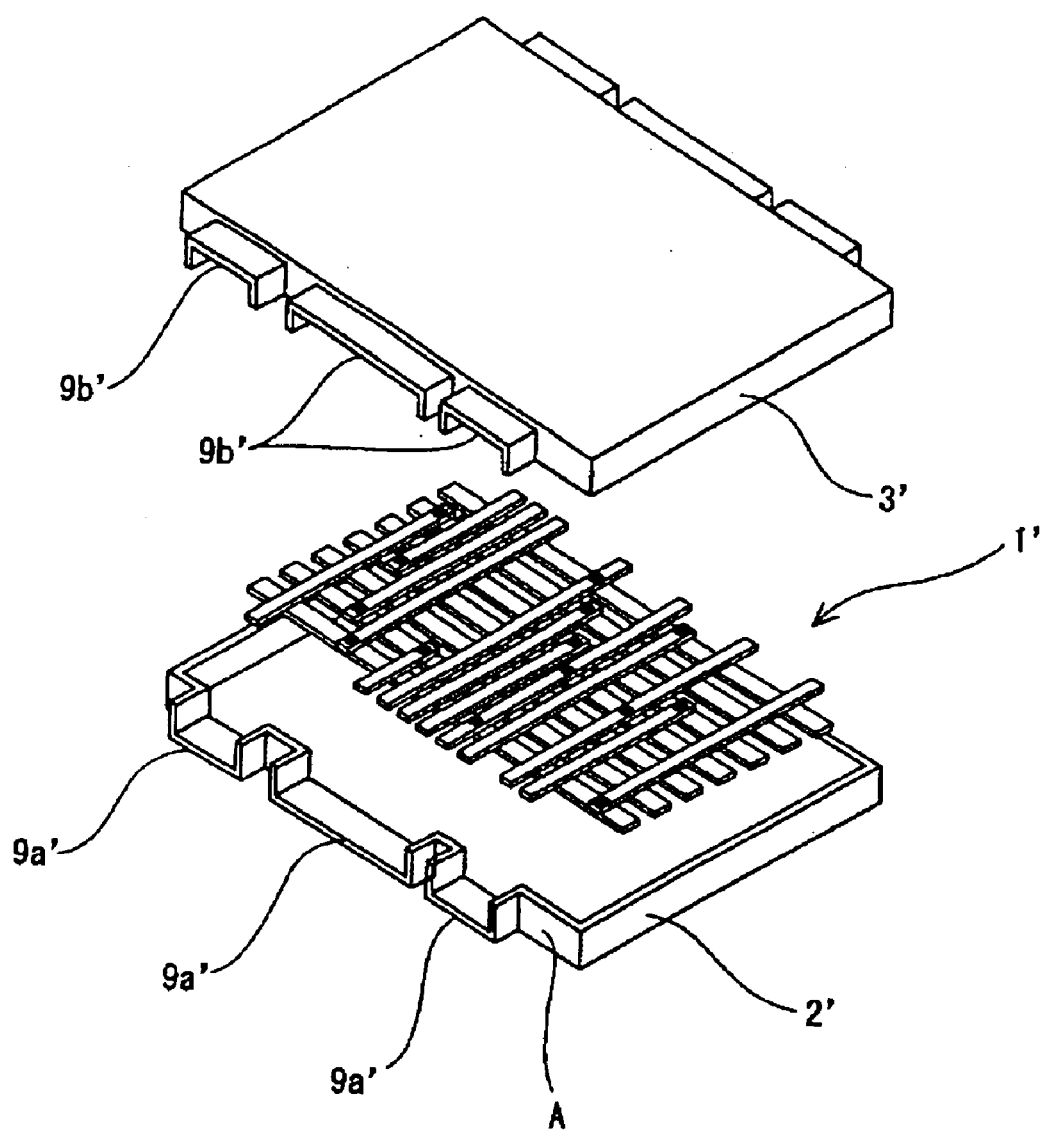
FIG. 8 is an exploded perspective view of a conventional electrical junction box.

FIGS. 6A and 6B show an alteration of a joint portion between the first and second hood sections. A first hood section 24' is provided in the opposite end surfaces facing a lower channel with V-notches 24e' extending along a longitudinal direction. A support plate 25a' of a second hood section 25 is provided on the opposite end surfaces 25d' with engaging projections 25e' having a V-shape in cross section. The second hood section 25' may be coupled to the first hood section 24' by fitting the engaging projections 25e' into the grooves 24e'. Thus, such engagement of the projections 25e' and grooves 24e can enhance a coupling force.

Although the first hood section 24 of the upper casing member 11 is formed into a U-shape in cross section having the holding portions 24a extending inward on the ends of the opposed arms and the second hood section 25 is formed into a flat plate in the above embodiment, the first hood section 24 may be formed into the flat plate and the second hood section 25 may be formed into the U-shape in cross section. Although the connector hood 23 extends inward and outward from the sidewalls 21 and 22 of the electrical junction box 10 in the above embodiment, it may extend either inward or outward from the sidewalls 21 and 22.

It will be apparent from the foregoing that according to various exemplary embodiments of the present invention, because the connector hood for receiving a connector for lateral connection is provided on the sidewall of the electrical junction box, it is possible to reduce an attachment space in the thickness direction of the electrical junction box.

Although the connector hood is formed into a divided structure including the first and second hood sections, because the one of the hood sections has holding portions that extend inward on the ends of the arms of the U-shape and can hold the mating connector, it is possible to prevent the connector hood from being deformed by the undue insertion of the mating connector. Accordingly, it is possible to steadily hold the mating connector.

Although the invention has been described with reference to particular means, materials and exemplary embodiments, it is to be understood that the invention is not limited to the particulars disclosed and extends to all equivalents within the scope of the claims. It is evident that many alternatives, modifications, and variations will be apparent to those skilled in the art in light of the foregoing description. It is therefore contemplated that the appended claims will embrace any such alternatives, modifications, and variations as falling within the true scope and spirit of the invention.

What is claimed is:

1. An electrical junction box, comprising:

a casing including an upper casing member and a lower casing member; and a connector hood provided on a sidewall of the casing for receiving a connector for lateral connection, the connector hood including:
 a first hood section projecting from a sidewall of the upper casing member, and
 a second hood section projecting from a sidewall of the lower casing member, the connector hood being formed into a square frame configuration when the first and second hood sections are coupled to each other; wherein one of the first and second hood sections is formed into a U-shape in cross section, each arm of the U-shape is provided on the free end with a holding portion extending inward, and the other of the first and second hood sections is formed into a flat plate to be fitted in a channel defined between the holding portions, whereby the hood section provided with the holding portions can hold a mating connector received in the connector hood.

2. The electrical junction box according to claim 1, wherein the first and second hood sections are provided on inner parts with first and second partitions, a tab to be connected to a terminal of the mating connector is clamped between jointing surfaces of the first and second partitions.

* * * * *